United States Patent [19]  
Caunt et al.

[11] 4,301,029  
[45] Nov. 17, 1981

[54] OLEFIN POLYMERIZATION CATALYST AND THE PRODUCTION AND USE THEREOF

[75] Inventors: Anthony D. Caunt, Welwyn Garden City; Paul D. Gavens, Lower Stondon, both of England

[73] Assignee: Imperial Chemical Industries Limited, London, England

[21] Appl. No.: 111,184

[22] Filed: Jan. 10, 1980

Related U.S. Application Data

[63] Continuation-in-part of Ser. No. 24,081, Mar. 26, 1979, abandoned.

[30] Foreign Application Priority Data

Jan. 10, 1979 [GB] United Kingdom .................. 942/79  
Nov. 5, 1979 [GB] United Kingdom .............. 38176/79

[51] Int. Cl.$^3$ .............................................. C08F 4/64  
[52] U.S. Cl. ................................ 252/429 B; 526/127; 526/128; 526/137; 526/139; 526/140; 526/141; 526/142; 526/143  
[58] Field of Search ...................................... 252/429 B

[56] References Cited

U.S. PATENT DOCUMENTS

| | | | |
|---|---|---|---|
| 3,121,064 | 2/1964 | Patat et al. | 252/429 B |
| 3,202,645 | 8/1965 | Yancey | 252/429 B X |
| 3,222,296 | 12/1965 | Aftandilian | 252/429 B |
| 3,499,882 | 3/1970 | Nudenberg et al. | 252/429 B X |
| 3,549,717 | 12/1970 | Itakura et al. | 252/429 B X |
| 3,878,124 | 4/1975 | Durand et al. | 252/429 B |
| 3,888,789 | 6/1975 | Dombro et al. | 252/429 B |
| 4,115,319 | 9/1978 | Scata et al. | 252/429 B |

FOREIGN PATENT DOCUMENTS

| | | |
|---|---|---|
| 2008619 | 1/1970 | France . |
| 2390456 | 8/1978 | France . |
| 1235062 | 6/1971 | United Kingdom . |
| 1286867 | 8/1972 | United Kingdom . |
| 1306044 | 2/1973 | United Kingdom . |
| 1352718 | 5/1974 | United Kingdom . |
| 1484254 | 9/1977 | United Kingdom . |
| 2015009 | 9/1979 | United Kingdom . |

*Primary Examiner*—Patrick Garvin  
*Attorney, Agent, or Firm*—Cushman, Darby & Cushman

[57] ABSTRACT

A component of a polymerization catalyst is prepared by reacting an organo-magnesium compound, or a complex with an organo-aluminium compound, with a solid, inorganic oxide, then with a halogenating agent such as silicon tetrachloride or hydrogen chloride, and then reacting the product with a Lewis Base compound, particularly an ester and finally with titanium tetrachloride. The product obtained is combined with an organo-aluminium compound, preferably together with a Lewis Base, and used to polymerize an olefin monomer particularly propylene or mixtures of ethylene and a 1-olefin containing at least 4 carbon atoms. The catalyst system has a high activity, is stereospecific and has a lower proportion of halogen than some other catalyst systems.

14 Claims, 1 Drawing Figure

A $\quad$ $MgR_2$

B $\quad$ $MgR_2 \, aAlR_3$

C $\quad$ $MgR_2 + aAlR_3$

D $\quad$ $R^1_b SiX_{(4-b)}$

E $\quad$ $R^2COX$

F $\quad$ $R^3X_c$

G $\quad$ $R^4 - \underset{\underset{OR^7}{|}}{\overset{\overset{OR^5}{|}}{C}} - OR^6$ H $\quad$ $R^8COOR^9$ J $\quad$ $CH_2=CHR^{10}$

OLEFIN POLYMERIZATION CATALYST AND THE PRODUCTION AND USE THEREOF

This application is a continuation-in-part application of our U.S. Ser. No. 24,081 filed Mar. 26, 1979 and now abandoned.

The present invention relates to a process for the production of a component of an olefine polymerisation catalyst, polymerisation catalysts including the component thus obtained and an olefine polymerisation process using such catalysts.

Olefine monomers, such as ethylene, propylene and the higher alpha-olefines, can be polymerised using the so-called Ziegler-Natta catalysts. The term "Ziegler-Natta catalyst" is generally used to mean a catalyst system obtained from a compound of a transition metal of Groups IVA to VIA of the Periodic Table together with an organometallic compound of a non-transition metal of Groups IA to IIIA of the Periodic Table. Using such catalysts, propylene and the higher alpha-olefines are polymerised to form a mixture of isotactic and atactic polymer, the isotactic polymer being the commercially desirable material. The polymer formed also contains catalyst residues and hitherto these have been present in such proportions that it has been necessary to treat the polymer to reduce the level of such residues.

There have been many proposals to improve the activity and/or stereospecificity of the catalyst system. Such proposals include the use of additional catalyst components, typically Lewis Base compounds, or the modification of one or other or both of the components of the catalyst system. There have been proposals to support the catalyst system on a solid inorganic oxide but usually such supported catalysts have been of low stereospecificity.

According to the present invention there is provided a process for the production of a composition suitable for use as a component of an olefine polymerisation catalyst, which process comprises treating a component I which is at least one solid inorganic oxide with a component II which is a magnesium hydrocarbyl compound, or a complex or mixture of a magnesium hydrocarbyl compound and an aluminium hydrocarbyl compound, a component III which is at least one halogenating agent, a component IV which is a Lewis Base compound and a component V which is titanium tetrachloride, wherein (A) component I is reacted with either component II or component III;
(B) the product from step (A) is reacted with whichever of component II or component III is not used in stage (A);
(C) the product of stage (B) is reacted with either component IV or component V; and
(D) the product of stage (C) is reacted with whichever of component IV or component V is not used in stage (C);

and stages (B) and (C) can be effected simultaneously using components III and IV.

It is preferred that in stage (A), component I is reacted with component II and in stage (B), the product from stage (A) is reacted with component III. It is particularly preferred that in stage (C), the product of stage (B) is reacted with component IV. Whilst it is within the scope of the present invention to react component I with component II in stage (A), and react the product from stage (A) with a mixture of components III and IV, thus effecting stages (B) and (C) simultaneously, it is preferred to effect all of stages (A), (B), (C) and (D) separately.

Thus, according to a particularly preferred aspect of the present invention, in stage (A), component I is reacted with component II, in stage (B), the product from stage (A) is reacted with component III, in stage (C), which is effected separately from stage (B), the product of stage (B) is reacted with component IV; and in stage (D), the product of stage (C) is reacted with component V.

Suitable materials for use as component I, the at least one solid inorganic oxide, include the oxides of the metals (including silicon), and in particular the oxides of the metals of Groups I to IV of the Periodic Table. Solid inorganic oxides which may be used as component I include those with a substantially inert matrix material having a hydroxylic surface (as hereinafter defined) which is free from adsorbed water. By "hydroxylic surface" is meant a surface having a plurality of —OH groups attached to the surface, the hydrogen atom of the —OH group being capable of acting as a proton source, that is, having an acidic function. A matrix material having such a surface is substantially inert in that the bulk of the matrix material is chemically inert.

The at least one solid inorganic oxide may be silica, alumina, magnesia, mixtures of two or more thereof, for example magnesium trisilicate which may be represented as $(MgO)_2(SiO_2)_3$, or materials based thereon and containing minor amounts, for example less than 10% by weight, of other suitable solid inorganic oxides such as zinc oxide. A particularly useful solid inorganic oxide is silica.

The at least one solid inorganic oxide preferably has a surface area of at least 30 $m^2/g$, particularly at least 100 $m^2/g$ and especially at least 200 $m^2/g$. Useful forms of the at least one solid inorganic oxide may be obtained by heating an inorganic oxide or hydroxide in an inert atmosphere, and/or at a reduced pressure, to a temperature of at least 200° C. and not more than 1200° C. and preferably in the range 300° to 1000° C. A suitable inert atmosphere for the heating is nitrogen and a suitable reduced pressure is less than 10 mm of mercury. The temperature used will be dependent on the material being heated. Thus, if silica is being heated, it is especially preferred to use a temperature in the range 320° up to 400° C., for example 350° C. Using hydrated alumina, for example Boehmite (which may be regarded as hydrated gammaalumina), or aluminium hydroxide, it is especially preferred to use a temperature in the range 400° up to 1000° C., for example 500° C.

The magnesium hydrocarbyl compound, or the complex or mixture of the magnesium hydrocarbyl compound and an aluminium hydrocarbyl compound, is conveniently added, as a liquid medium, to a solid material which is either the solid inorganic oxide or the product of stage (A), which solid material may be suspended in an inert liquid medium such as an aliphatic hydrocarbon. The liquid medium is conveniently a solution of the magnesium hydrocarbyl compound, or the mixture or complex of the magnesium hydrocarbyl compound and the aluminium hydrocarbyl compound, in an inert liquid such as a hydrocarbon liquid, for example hexane, heptane, octane, decane, dodecane or mixtures of the isomers thereof, or an inert halohydrocarbon such as chlorobenzene.

The magnesium hydrocarbyl compound is a compound of formula (A) in the attached formula drawings. The complex of the magnesium hydrocarbyl compound with the aluminium hydrocarbyl compound is represented by formula (B) in the attached formula drawings. The mixture of the magnesium hydrocarbyl compound with the aluminium hydrocarbyl compound is represented by formula (C) in the attached formula drawings.

In the formulae (A), (B) and (C),
each R, which may be the same or different, is a hydrocarbyl group, typically an alkyl group, conveniently an alkyl group containing from 1 up to 20 carbon atoms, especially 1 up to 6 carbon atoms; and
a has a value up to 2, typically 0.05 up to 1.0.

It will be appreciated that the materials of formulae (B) and (C) may be present together as an equilibrium mixture and indeed such a mixture can be obtained merely by mixing together the magnesium hydrocarbyl compound with the aluminium hydrocarbyl compound when the resulting product will be a mixture of magnesium hydrocarbyl compound, the aluminium hydrocarbyl compound and the complex of formula (B). It will be appreciated that it is preferred that the compound of formula (A), (B) or (C) is a material which is soluble in inert liquid hydrocarbons.

The quantity of the compound (A), (B) or (C) which is added to the at least one solid inorganic oxide, or the product from stage (A), is dependent on the nature of the at least one solid inorganic oxide, the surface area thereof and, in particular, any heat treatment used in obtaining the solid inorganic oxide. The quantity of the compound (A), (B) or (C) which is added is desirably in excess of that required to saturate the surface of the solid inorganic oxide and is conveniently in excess of one mole for each mole of reactive sites on the solid inorganic oxide. The reactive sites are typically surface hydroxyl groups and the proportion thereof can be readily determined by adding, to the at least one solid inorganic oxide, a solution containing an excess quantity of the compound (A) and analysing the solution to determine both the quantity of compound (A) which remains unreacted and the quantity of RH which is formed. The compound (A), (B) or (C) can be added to the at least one solid inorganic oxide, or the product from stage (A), at any suitable temperature, for example from 0° C. up to 100° C., conveniently at ambient temperature, that is from about 15° C. up to about 25° C. After adding the compound (A), (B) or (C) to the at least one solid inorganic oxide, or the product from stage (A), reaction is conveniently effected by allowing the materials to remain in contact for at least 5 minutes and not more than 20 hours, for example 0.25 up to 6 hours. After the desired period of contacting, the solid material is separated from the liquid medium and then may be washed one or more times and finally subjected to an optional low pressure (about 1 mm of mercury) treatment at ambient temperature, or higher, for a time of up to several hours, for example two hours, before being used in the next stage of the preparation.

The at least one halogenating agent which is component III, is preferably a chlorinating agent. Suitable halogenating agents include hydrogen halides such as hydrogen chloride, silicon halides of the formula (D) in the attached formula drawings, carboxylic acid halides of the formula (E) in the attached formula drawings, hydrocarbyl halides of the formula (F) in the attached formula drawings, phosphorus pentachloride, thionyl chloride, sulphuryl chloride, phosgene, nitrosyl chloride, halides of mineral acids, chlorine, bromine, chlorinated polysiloxanes, hydrocarbyl aluminium halides, aluminium chloride and ammonium hexafluorosilicate, wherein $R^1$ is hydrogen or a hydrocarbyl group, preferably an alkyl group containing 1 up to 6 carbon atoms or an aryl, alkaryl or aralkyl group containing 6 up to 15 carbon atoms;

$R^2$ is a hydrocarbyl group, preferably an alkyl group containing 1 up to 4 carbon atoms or an aryl, alkaryl or aralkyl group containing 6 up to 12 carbon atoms;

$R^3$ is a hydrocarbyl residue;

X is a halogen atom, for example bromine or especially chlorine;

b is 0 or an integer from 1 up to 3; and c is an integer from 1 up to 10.

The silicon halides of formula (D) include silicon tetrachloride, silicon tetrabromide and halosilanes such as trichlorosilane, trimethyl silicon monochloride, dimethyl silicon dichloride, diethyl silicon dichloride, monobutyl silicon trichloride and monomethyl silicon trichloride.

The carboxylic acid halides of formula (E) include acetyl chloride, benzoyl chloride and p-methylbenzoyl chloride.

The hydrocarbyl halides of formula (F) include carbon tetrachloride, chloroform, ethyl chloride, ethylene dichloride and 1,1,1-trichloroethane.

Halides of mineral acids include boron trichloride, tin tetrachloride and antimony pentachloride.

Hydrocarbyl aluminium halides include diethyl aluminium chloride and monoethyl aluminium dichloride.

We have obtained useful results using silicon halides, particularly silicon tetrachloride and trichlorosilane or hydrogen chloride as the at least one halogenating agent.

The quantity of the at least one halogenating agent is preferably sufficient to provide at least one halogen atom at every reactive site on the solid inorganic oxide. The reaction with the at least one halogenating agent can be effected at ambient temperature or at an elevated temperature of up to 100° C. The preferred temperature is dependent on the particular halogenating agent, for example using silicon tetrachloride, the temperature is preferably at least 60° C. The reaction is conveniently carried out by adding the at least one halogenating agent to a stirred suspension of the at least one solid inorganic oxide or the product from stage (A). Using a gaseous halogenating agent such as hydrogen chloride, the gas can be passed into the reaction medium until no further absorption is observed to occur. The reaction with the at least one halogenating agent is conveniently effected for from 0.25 up to 10 hours, preferably from 1 up to 5 hours.

After the reaction with the at least one halogenating agent, the reaction product is conveniently separated from the reaction medium and washed several times.

The product of stage (B) or stage (C) is reacted with a Lewis Base compound. The reaction is conveniently effected by forming a suspension of the product of stage (B) or stage (C) in an inert liquid medium such as an inert liquid hydrocarbon or halohydrocarbon, and adding the Lewis Base compound to this suspension. The quantity of Lewis Base added is conveniently in an amount of up to 1 mole of Lewis Base compound for each mole of magnesium, or magnesium plus aluminium, which is present in the supported product. Preferred quantities of the Lewis Base compound are from 0.1 up to 0.8 mole, especially at least 0.5 up to 0.8 mole, for each mole of magnesium or magnesium plus aluminium.

The reaction of the Lewis Base compound with the product of stage (B) or stage (C) may be effected at temperatures of from 0° C. up to 100° C. and is very conveniently carried out at ambient temperature, that is from about 15° C. up to about 30° C. After adding the Lewis Base compound to the product of stage (B) or stage (C), the materials are conveniently allowed to remain in contact for 0.1 up to 70 hours, preferably 1 up to 20 hours.

The Lewis Base compound can be any organic Lewis Base compound which has been proposed for use in a Ziegler polymerisation catalyst and which affects either the activity or stereospecificity of such a system. Thus, the Lewis Base compound may be an ether, an ester, a ketone, an alcohol, an ortho-ester, a thioether, a thioester, a thioketone, a thiol, a sulphone, a sulphonamide, a fused ring compound containing a heterocyclic sulphur atom, an organo-silicon compound such as a silane or siloxane, an amide such as formamide, urea and the substituted derivatives thereof such as tetramethylurea, thiourea, an alkanolamine, an amine, a cyclic amine such as pyridine or quinoline, a diamine such as tetramethylethylenediamine or an organo-phosphorus compound such as an organo-phosphine, an organo-phosphine oxide, an organo-phosphite or an organo-phosphate. The use of organo-Lewis Base compounds is disclosed, inter alia, in British Patent Specifications 803,198, 809,717, 880,998, 896,509, 920,118, 921,954, 933,236, 940,125, 966,025, 969,074, 971,248, 1,013,363, 1,017,977, 1,049,723, 1,122,010, 1,150,845, 1,208,815, 1,234,657, 1,324,173, 1,359,328, 1,383,207, 1,423,658, 1,423,659 and 1,423,660.

Particularly useful Lewis Base compounds include ethers, alcohols, ortho-esters and esters.

If the Lewis Base compound is an ether, it is preferably a dialkyl ether, particularly one in which each alkyl group contains at least 4 carbon atoms and conveniently not more than 10 carbon atoms, for example di-butyl ether or di-isoamyl ether.

If the Lewis Base is an alcohol it is conveniently an alkyl alcohol, particularly one in which the alkyl group contains from 1 to 10 carbon atoms, especially 2 to 6 carbon atoms, for example ethanol.

If the Lewis Base compound is an ortho-ester, it is particularly an aromatic carboxylic acid ester represented by the formula (G) in the attached formula drawings.

In the formula (G), $R^4$ is an aromatic hydrocarbyl group; and
each of $R^5$, $R^6$ and $R^7$, which may be the same or different, is a hydrocarbyl group.

It is preferred that the groups $R^5$, $R^6$ and $R^7$, which are conveniently all the same, are alkyl groups containing up to 10 carbon atoms, for example as in trimethyl orthobenzoate.

Preferred Lewis Base compounds are esters which may be represented by the formula (H) given in the attached formula drawings.

In the formula (H), $R^8$ is a hydrocarbyl group, which may be substituted by one or more halogen atoms and/or hydrocarbyloxyl groups; and $R^9$ is a hydrocarbyl group which may be substituted by one or more halogen atoms.

The groups $R^8$ and $R^9$ may be the same or different and it is preferred that one, but not both, of the groups $R^8$ and $R^9$ includes an aryl group. The group $R^8$ is conveniently an optionally substituted alkyl or aryl group, for example a methyl, ethyl, or especially a phenyl, tolyl, methoxyphenyl or fluorophenyl group. The group $R^9$ is preferably an alkyl group containing up to 6 carbon atoms, for example an ethyl or a butyl group. It is particularly preferred that $R^8$ is an aryl or haloaryl group and $R^9$ is an alkyl group. Examples of esters of formula (H) include ethyl benzoate, ethyl p-toluate, ethyl anisate and ethyl p-fluorobenzoate.

After contacting with the Lewis Base compound, the product thus formed is conveniently separated from the reaction medium and washed with an inert liquid.

Titanium tetrachloride is added to the product of stage (B) or stage (C). This addition may be effected by adding a solution of titanium tetrachloride to the solid product from the previous stage but is conveniently carried out by suspending the solid reaction product in undiluted titanium tetrachloride. The amount of titanium tetrachloride is preferably in a molar excess relative to the magnesium, or magnesium plus aluminium, which is present in the supported product. The reaction is conveniently carried out at a temperature from 0° C. up to the boiling temperature of titanium tetrachloride which is about 137° C. at atmospheric pressure. Preferably the reaction is carried out at a temperature of from 60° C. up to 120° C. especially 75° C. to 100° C. After adding the titanium tetrachloride to the solid, the materials are conveniently allowed to remain in contact for from 0.25 up to 10 hours, preferably 1 up to 5 hours. After the desired period of contacting, the product obtained is separated from the unreacted titanium tetrachloride and washed several times with an inert liquid medium.

The product may be separated and washed between each stage of the reaction but it should be appreciated that it is not necessary to do this at all stages of the process.

The product obtained contains a titanium compound and a magnesium halide composition supported on a solid inorganic oxide. This product may be used as one component of an olefine polymerisation catalyst.

More specifically, as a further aspect of the present invention, there is provided an olefine polymerisation catalyst which comprises (1) the reaction product obtained by the process of the present invention; and
(2) an organic compound of a metal of Group IIA of the Periodic Table or of aluminium or a complex of an organo-metallic compound of a metal of Group IA or Group IIA of the Periodic Table with an organic compound of aluminium.

Component (2) of the catalyst can be a Grignard reagent, preferably one which is substantially ether-free, or can be a compound of formula (A) or (B) in the attached formula drawings. If the component (2) is a complex of a metal of Group IA with an organo-aluminium compound, this compound may be of the type lithium aluminium tetraalkyl. It is preferred that the component (2) is an organo-aluminium compound which may be an aluminium hydrocarbyl halide such as a dihydrocarbyl aluminium halide, an aluminium hydrocarbyl sulphate, or an aluminium hydrocarbyl hydrocarbyloxy but is preferably an aluminium trihydrocarbyl or a dihydrocarbyl aluminium hydride. The aluminium trihydrocarbyl is preferably an aluminium trialkyl in which the alkyl group contains from 1 up to 4 carbon atoms and is particularly an ethyl group.

Using an aluminium trihydrocarbyl as component (2) it is preferred that the catalyst system also includes a Lewis Base compound. The Lewis Base compound can be any Lewis Base compound of the type disclosed for the production of component (1) of the catalyst system. However, preferred Lewis Base compounds are esters of formula (H). Esters of anisic acid (4-methoxybenzoic acid) are particularly preferred as the Lewis Base component of the catalyst system.

In addition to, or instead of, the Lewis Base compounds, the catalyst system may also include a substituted or unsubstituted polyene, which may be an acyclic polyene such as 3-methylheptatriene(1,4,6), or a cyclic polyene such as cyclooctatriene, cyclooctatetraene, or cycloheptatriene or the alkyl- or alkoxy-substituted derivatives of such cyclic polyenes, tropylium salts or complexes, tropolone or tropone.

The proportions of components (1) and (2) of the catalyst system can be varied within a wide range as is well known to the skilled worker. The particular preferred proportions will be dependent on the type of materials used and the absolute concentrations of the components but in general we prefer that for each gramme atom of titanium which is present in component (1) of the catalyst system there is present at least 1 mole of component (2) and preferably at least 5 moles of component (2) for each gramme atom of titanium. The number of moles of component (2) for each gramme atom of titanium in component (1) may be as high as 1000 and conveniently does not exceed 500.

When the catalyst system includes a Lewis Base component in addition to component (2), it is preferred that the Lewis Base compound is present in an amount of not more than 1 mole for each mole of component (2) and particularly from 0.1 up to 0.5 mole of the Lewis Base compound for each mole of the component (2). However, depending the particular organo-metallic compound and Lewis Base compound, the proportion of the Lewis Base compound may need to be varied to achieve the optimum catalyst system.

If the catalyst system includes a polyene, it is preferred that the polyene is present in an amount of not more than one mole for each mole of component (2), and especially from 0.01 up to 0.20 mole for each mole of component (2). If the catalyst system includes both a Lewis Base component and a polyene, it is preferred that both of these materials are together present in an amount of not more than one mole for each mole of component (2).

Catalysts in accordance with the present invention can be used to polymerise or copolymerise olefine monomers.

Thus, as a further aspect of the present invention there is provided an olefine polymerisation process which comprises contacting, under polymerisation conditions, at least one olefine monomer with a catalyst in accordance with the present invention.

The olefine monomer which may be contacted with the catalyst system is one having the formula (J) as set out in the accompanying formula drawings.

In the formula (J), $R^{10}$ is a hydrogen atom or an alkyl radical.

Thus, the olefine may be ethylene, propylene, butene-1, pentene-1, hexene-1, 4-methylpentene-1 or any other olefine which satisfies formula (J). The olefine monomer is preferably one containing not more than 10 carbon atoms. The olefine monomers may be homopolymerised or may be copolymerised together. If propylene is copolymerised it is preferred to effect the copolymerisation with ethylene, conveniently using a sequential copolymerisation process as is described in British Patents 970,478; 970,479 and 1,014,944. If ethylene is being copolymerised using the process of the present invention, it is preferred to carry out the copolymerisation using a mixture of ethylene and the desired comonomer, for example butene-1 or hexene-1, wherein the mixture of monomers has essentially the same composition throughout the polymerisation process.

It has been found that the process of the present invention can be used for the polymerisation of propylene to give a relatively low proportion of the undesirable soluble polymer and also a high yield of polymer relative to the amount of titanium which is present in component (1) of the catalyst system.

It is preferred to mix component (1) of the catalyst with the other component or components in the presence of the monomer. If the catalyst includes a Lewis Base compound, it is preferred to premix the organometallic compound which is component (2) with the Lewis Base compound. This pre-mixture and the reaction product which is component (1) are then mixed together.

As is well known, Ziegler-Natta type catalysts are susceptible to the presence of impurities in the polymerisation system. Accordingly, it is desirable to effect the polymerisation using a monomer, and a diluent if this is being used, which has a high degree of purity, for example a monomer which contains less than 5 ppm by weight of water and less than 1 ppm by weight of oxygen. Materials having a high degree of purity can be obtained by processes such as those described in British Patent Specification Nos. 1,111,493; 1,226,659 and 1,383,611.

Polymerisation can be carried out in the known manner, for example in the presence or absence of an inert diluent such as a suitably purified paraffinic hydrocarbon, in the liquid phase using an excess of the liquid monomer as the polymerisation medium or in gas phase, this latter term being used herein to mean the essential absence of a liquid medium.

If polymerisation is effected in gas phase, it may be effected by introducing the monomer, for example propylene, into the polymerisation vessel as a liquid and operating with conditions of temperature and pressure within the polymerisation vessel which is such that the liquid monomer vaporises, thereby giving an evaporative cooling effect, and essentially all of the polymerisation occurs with a gaseous monomer. Polymerisation in gas phase may be effected using conditions which are such that the monomer is at a temperature and partial pressure which are close to the dew point temperature and pressure for that monomer, for example as described in more detail in published German Patent Application No. 2,616,356. Polymerisation in gas phase can be effected using any technique suitable for effecting a gas-solid reaction such as a fluidised-bed reactor system, a stirred-bed reactor system or a ribbon blender type of reactor.

Using the catalyst systems of the present invention, ethylene may be polymerised or copolymerised, for example with butene-1 as the comonomer, in a fluidised-bed reactor system to give a high yield of polymer, which may be as high as 15 kg of polymer for each millimole of titanium present in the catalyst, that is less than 4 parts per million by weight of titanium is present in the polymer product. The fluidising gas is the gas mixture to be polymerised together with any hydrogen which is present as a chain transfer agent to control molecular weight. Thus, for the copolymerisation of ethylene and butene-1 to produce an ethylene copolymer having a density of less than about 940 kg/m$^3$, the gas composition is typically from 50 to 60 mole % ethylene, 15 to 25 mole % butene-1 with the remainder, apart from inert materials and impurities, being hydrogen.

Polymerisation may be effected either in a batch manner or on a continuous basis. The catalyst components may be introduced into the polymerisation vessel separately or all the catalyst components may be mixed together before being introduced into the polymerisation reactor. It will be appreciated that any pre-mixing of all the catalyst components is preferably effected in the presence of a monomer and such pre-mixing will result in polymerisation of this monomer before the catalyst system is introduced into the polymerisation vessel.

The polymerisation can be effected in the presence of a chain transfer agent such as hydrogen or a zinc dialkyl, in order to control the molecular weight of the product formed. If hydrogen is used as the chain transfer agent in the polymerisation of propylene, it is conveniently used in an amount of from 0.01 up to 5.0%, particularly from 0.05 up to 2.0% molar relative to the monomer. When the monomer being polymerised is ethylene, or a mixture in which ethylene is a major polymerisable component (by moles), the amount of hydrogen used may be greater, for example, in the homopolymerisation of ethylene the reaction mixture may contain in excess of 50% molar of hydrogen, whereas if ethylene is being copolymerised, a proportion of hydrogen which is typically up to 35% molar is used. The amount of chain transfer agent will be dependent on the polymerisation conditions, especially the temperature, which, at polymerisation pressures not exceeding 50 kg/cm$^2$, is typically in the range from 20° C. up to 100° C., preferably from 50° C. up to 85° C.

Polymerisation can be effected at any pressure which has been previously proposed for effecting the polymerisation of olefine monomers. However, although the polymerisation may be effected at pressures up to 3000 Kg/cm$^2$, at which pressures the polymerisation temperature may be as high as 260° C., it is preferred to carry out the polymerisation at relatively low pressures. Whilst the polymerisation may be effected at atmospheric pressure, it is preferred to use a slightly elevated pressure and thus it is preferred that the polymerisation is effected at a pressure of from 1 Kg/cm$^2$ up to 50 Kg/cm$^2$, preferably from 5 up to 30 Kg/cm$^2$.

Using catalysts in accordance with the present invention ethylene or propylene may be polymerised to give polymers having desirable properties. Thus, propylene may be polymerised to give a polymer having a high flexural modulus, for example a modulus which is at least 1.30 GN/m$^2$ and especially up to 1.70 GN/m$^2$, the flexural modulus being determined using the procedure, and sample preparation, as described in Example 29. Ethylene copolymers with alpha-olefine comonomers such as butene-1 or hexene-1, may also be obtained using the catalysts in accordance with the present invention and these polymers have a desirable combination of characteristics.

When effecting the polymerisation or copolymerisation of ethylene, we have obtained particularly useful results when the Lewis Base compound used in the preparation of the titanium-containing catalyst component is an alkyl ester of a haloaryl acid, for example ethyl p-fluorobenzoate. However, for the polymerisation of propylene we prefer than the Lewis Base compound used in the preparation of the titanium-containing catalyst component is an alkyl ester of an aryl acid, for example ethyl benzoate or ethyl p-toluate.

It will be appreciated that the particle form of the polymer obtained is dependent upon, and hence is affected by, the particle form of the solid inorganic oxide which is used as component I in the production of the transition metal composition which is component (1) of the catalyst system. Hence, by the selection of a solid inorganic oxide having an appropriate particle form, such as essentially spherical particles, a polymer of a desired form may be obtained.

Various aspects of the present invention will now be described with reference to the following Examples which are illustrative of the invention. In the Examples, all operations are effected under an atmosphere of nitrogen unless otherwise indicated.

(A) Treatment of silica

A sample of silica having a high specific surface area ('Ultrasil' grade VN 3 obtainable from I D Chemicals Ltd, of Runcorn, England) was heated up to 350° C. under a stream of nitrogen at atmospheric pressure, maintained at 350° C. for two hours and then allowed to cool, in the oven, to ambient temperature.

(B) Treatment of alumina

A sample of hydrated gamma-alumina (Ketjen Grade B obtainable from Akzo Chemie of Amsterdam, Holland) was heated up to 500° C. under a stream of nitrogen at atmospheric pressure, maintained at 500° C. for two hours and then allowed to cool, in the oven, to ambient temperature.

(C) Treatment of alumina

A sample of the heated solid obtained by the procedure of (B) was immersed in water at ambient temperature for 15 minutes. The solid was then dried for two hours at a temperature of 120° C. and a nitrogen pressure of 0.1 mm of mercury.

(D) Treatment of alumina

The procedure described in (B) was repeated except that the temperature used was 1000° C.

(E) Treatment of silica

The procedure of (A) was repeated using a different type of silica (Davison 952 grade obtainable from W R Grace and Company of Maryland, USA).

(F) Treatment of silica

The procedure of (E) was repeated using a temperature of 700° C. and a time of six hours.

(G) Treatment of silica

The procedure of (E) was repeated using a temperature of 400° C. and a time of two hours.

(H) Treatment of alumina

The procedure of (B) was repeated with the exception that the temperature of 500° C. was maintained for three hours.

EXAMPLE 1

(A) Reaction with silica and magnesium dibutyl 9 g of the silica dried as described in treatment (A) were suspended in 70 cm$^3$ of n-heptane in a 300 cm$^3$ reaction vessel provided with a sintered glass frit and a stirrer. 18 cm$^3$ of a 0.56 M solution of magnesium dibutyl (an equimolar mixture of primary and secondary dibutyl magnesium) in an isoparaffin fraction, essentially all of which had a boiling temperature in the range from 117° C. to 135° C., were added to the suspension. The mixture was then stirred at ambient temperature (about 20° C.) for two hours.

(B) Treatment with silicon tetrachloride

To the mixture from step (A) were added 50 cm$^3$ of silicon tetrachloride. This mixture was stirred for 60 hours at ambient temperature then heated up to 80° C. and stirred at that temperature for a further three hours. The mixture was then allowed to cool and settle, the liquid was filtered off and the solid was washed three times using 100 cm$^3$ of n-heptane at ambient temperature for each wash.

(C) Treatment with ethyl benzoate

The washed solid from step (B) was suspended in a solution of 1 cm$^3$ of ethyl benzoate in 50 cm$^3$ of n-heptane and the mixture was stirred at ambient temperature for 16 hours. The mixture was then filtered and the solid was washed three times using 100 cm$^3$ of n-heptane at ambient temperature for each wash.

(D) Treatment with titanium tetrachloride

The washed solid from step (C) was suspended in 100 cm$^3$ of titanium tetrachloride, the mixture was heated to 80° C. and maintained at that temperature for two hours. The mixture was filtered without cooling and the solid was then washed four times using 100 cm$^3$ of n-heptane at 80° C. for each wash. The solid was finally suspended in 100 cm$^3$ of n-heptane at ambient temperature.

The foregoing procedure [steps (A), (B), (C) and (D)] was effected three times to obtain three products which are identified hereafter as 1-I, 1-II and 1-III.

EXAMPLE 2

The procedure described in Example 1 was repeated with the exception that in step (B), the treatment with silicon tetrachloride was effected at ambient temperature only (the heating up to 80° C. was omitted).

EXAMPLE 3

The procedure of Example 1 was repeated except that, at the end of step (A) the mixture was filtered, the solid was washed three times using 100 cm$^3$ of n-heptane at ambient temperature for each wash and the washed solid was suspended in 100 cm$^3$ of n-heptane at ambient temperature and thereafter treated as described in steps (B), (C) and (D) of Example 1.

EXAMPLE 4

The procedure of Example 3 was repeated with the exception that the conditions of step (A) were varied.

10 g of the silica dried as described in treatment (A), were suspended in 50 cm$^3$ of an aliphatic hydrocarbon fraction consisting mainly of pentamethylheptane isomers and having a boiling point in the range 170° C. up to 180° C. To this suspension were added 150 cm$^3$ of a 0.66 M solution of the magnesium dibutyl mixture in the isoparaffin fraction, both as described in step (A) of Example 1. The mixture was stirred at ambient temperature for 60 hours, heated to 90° C., maintained at 90° C. for five hours, cooled to ambient temperature, filtered and washed twice using 100 cm$^3$ of the pentamethylheptane fraction at ambient temperature. The washed solid was then suspended in 100 cm$^3$ of n-heptane and thereafter treated in accordance with steps (B), (C), and (D) of Example 1.

EXAMPLE 5

The procedure of Example 3 was repeated with the exception that some of the conditions were varied.

In step (A), to 12.6 g of the silica dried as described in treatment (E) were added 100 cm$^3$ of n-heptane and 40 cm$^3$ of the magnesium dibutyl solution. The mixture was stirred for 16 hours at ambient temperature then filtered and washed three times using 100 cm$^3$ of n-heptane for each wash. The washed solid was then suspended in 100 cm$^3$ of n-heptane.

In step (B), 50 cm$^3$ of silicon tetrachloride were added and the mixture was heated with stirring up to 80° C. and maintained at that temperature for three hours. The mixture was allowed to cool and the solid was separated and washed as in the previous examples.

In step (C), the washed solid from step (B) was suspended in a solution of 1.5 cm$^3$ of ethyl p-fluorobenzoate in 100 cm$^3$ of n-heptane.

In step (D), the mixture with titanium tetrachloride was maintained at 80° C. for four hours. The further procedure was as described in Example 1.

COMPARATIVE EXAMPLE A

The procedure of Example 3 was repeated except that step (B), the treatment with silicon tetrachloride, was omitted.

EXAMPLES 6 TO 27

The products of Examples 1 to 5 and Comparative Example A were used to polymerise propylene using the following procedure.

The propylene used for the polymerisation had been purified by passing gaseous propylene in turn through a column (7.6 cm diameter, 90 cm length) containing 1.58 mm granules of Alcoa F1 alumina at 50°-60° C., and then through a similar column containing BTS catalyst (Cupric oxide reduced to finely divided metallic copper on a magnesium oxide support) at 40°-50° C., condensing the issue gas and passing the liquid propylene through four columns (all 7.6 cm diameter; two of 90 cm in length, two of 1.8 m in length) at 25° C., each containing 1.58 mm pellets of Union Carbide 3A molecular sieves.

This treatment reduced the water content of the monomer from 5-10 ppm by volume to <1 ppm by volume and the oxygen content from 1-2 ppm by volume to <0.5 ppm by volume. The level of inert compounds (nitrogen, ethane, etc) was unchanged at 0.3% and the level of unsaturated hydrocarbons (allene, methylacetylene etc) was unchanged at <1 ppm.

A two-liter, glass polymerisation flask having three necks and equipped with an efficient stirrer and a water jacket was dried carefully and 1 liter of the pentamethylheptane fraction used in Example 4 was introduced. The liquid was vigorously stirred, evacuated at the polymerisation temperature (see Table 1), purged with nitrogen and evacuated, which treatment effectively reduced the water and oxygen contents of the pentamethylheptane fraction to below 10 ppm by weight.

Whilst still stirring the pentamethylheptane fraction and maintaining the temperature at the polymerisation temperature, the pentamethylheptane fraction was saturated with the purified propylene. Unless indicated to the contrary in Table 1. 8 millimoles of triethyl aluminium and then 3 millimoles of ethyl anisate, both as a solution in the pentamethylheptane fraction, were added. Finally between 5 cm$^3$ and 10 cm$^3$ of a suspension from one of the Examples 1 to 5 or Comparative Example A were added. Polymerisation was continued at the required temperature for a period of time as indicated in Table 1 whilst maintaining a pressure of 1 atmosphere by the addition of further propylene. At the end of the specified time, polymerisation was terminated by the addition of 10 cm$^3$ of isopropanol and an aliquot portion of the diluent was taken and the proportion of polymer dissolved in this aliquot was determined by evaporation to dryness. The polymer was filtered, washed three times with 200 cm$^3$ of petrol ether for each wash and dried in an oven at 120° C. and 0.1 mm of mercury pressure. From the yield of polymer obtained the conversion of polymer for each millimole of titanium present in the catalyst could be determined.

The results obtained are set out in Table 1.

TABLE 1

| Ex or Comp Ex (a) | Ti Compound Type | Amount (mM) (b) | Time (hrs) | Yield g/mM (c) | Wt % Diluent Soluble Polymer (d) | Temp (°C.) |
|---|---|---|---|---|---|---|
| 6* | 1-I | 0.55 | 3 | 79.4 | 33.7 | 60 |
| 7 | 1-I | 0.55 | 3 | 114.5 | 0.71 | 60 |
| 8 | 1-II | 0.52 | 2 | 99.9 | 0.69 | 60 |
| 9** | 1-II | 0.52 | 2 | 27.8 | 1.04 | 60 |
| 10 | 1-III | 0.45 | 2 | 110.1 | 0.60 | 60 |
| 11 | 1-III | 0.45 | 2 | 56.0 | 0.78 | 70 |
| 12 | 1-III | 0.45 | 2 | 134.1 | 0.70 | 50 |
| 13*** | 1-III | 0.45 | 2 | 105.6 | 0.47 | 60 |
| 14+ | 1-III | 0.45 | 2 | 136.3 | 1.15 | 60 |
| 15 | 2 | 0.44 | 2 | 31.5 | 0.58 | 60 |
| 16 | 3 | 0.18 | 2 | 160 | 0.76 | 60 |
| 17++ | 3 | 0.18 | 2 | 140.9 | 0.67 | 60 |
| 18+++ | 3 | 0.06 | 2 | 61.7 | <0.2 | 60 |
| 19° | 3 | 0.18 | 2 | 59.4 | 0.84 | 60 |
| 20°° | 3 | 0.18 | 2 | 107.5 | 2.84 | 60 |
| 21°°° | 3 | 0.18 | 2 | 96.2 | 0.69 | 60 |
| 22# | 3 | 0.18 | 2 | 255 | 33.4 | 60 |
| 23 | 3 | 0.18 | 2 | 64.1 | 1.21 | 30 |
| 24 | 3 | 0.18 | 2 | 37.3 | 3.13 | 80 |
| 25 | 4 | 0.41 | 2 | 93.6 | 0.47 | 60 |
| 26## | 5 | 0.48 | 2 | 89.4 | 6.53 | 60 |
| 27 | 5 | 0.96 | 2 | 39.9 | 1.04 | 60 |

TABLE 1-continued

| Ex or Comp Ex (a) | Ti Compound Type | Amount (mM) (b) | Time (hrs) | Yield g/mM (c) | Wt % Diluent Soluble Polymer (d) | Temp (°C.) |
|---|---|---|---|---|---|---|
| B | A | 0.36 | 2 | 47.6 | 4.17 | 60 |

Notes to Table 1
(a) *Catalyst contained titanium component and aluminium triethyl (10 mM) only.
**The catalyst components were premixed under nitrogen.
***Catalyst contained ethyl p-toluate (3 mM) instead of ethyl anisate.
+Catalyst contained tributyl aluminum (8 mM) and ethyl p-toluate (1 mM).
++Catalyst contained aluminium triethyl (4 mM) and ethyl anisate (1.5 mM).
+++Molar ratio aluminium triethyl:ethyl anisate:Ti 550:206:1.
°Ti compound and ethyl anisate (3 mM) mixed under nitrogen, and then added to the polymerisation vessel which contained aluminium triethyl (8 mM) under propylene at a pressure of one atmosphere.
°°To the vessel containing propylene was added aluminium triethyl (8 mM), the titanium compound and then ethyl anisate (3 mM).
°°°A mixture of aluminium triethyl and ethyl anisate was prepared by mixing 8.4 cm$^3$ of a solution, in the pentamethylheptane fraction, containing 8 mM of aluminium triethyl and 6 cm$^3$ of a solution, also in the pentamethylheptane fraction, containing 3 mM of ethyl anisate. 1.8 cm$^3$ of the mixture were added to the polymerisation vessel followed by the suspension of the product of Example 3. Further 1.8 cm$^3$ portions of the mixture were added 4, 12, 20 and 28 minutes after the addition of the product of Example 3 and the remaining 5.4 cm$^3$ of the mixture were added 52 minutes after the addition of the product of Example 3.
Catalyst contained titanium component and aluminium tributyl (8 mM) only.
Catalyst contained aluminium triethyl (8 mM) and ethyl anisate (1.5 mM).
(b) Amount is given as mM of titanium contained in the product of Examples 1 to 5 or Comparative Example A.
(c) Yield is expressed in grammes of total polymer (solid + soluble) obtained for each milligramme atom of titanium added in the Example or Comparative Example.
(d) Given by the relationship
$$\frac{\text{Wt of diluent soluble polymer} \times 100}{\text{Wt of total polymer}}$$

EXAMPLE 28

Polymerisation was carried out as described in Example 7 with the exception that the pentamethylheptane fraction was saturated with propylene which contained 0.025% by volume of hydrogen. Polymerisation was continued for 3 hours while maintaining a pressure of one atmosphere by the addition of propylene containing 0.066% by volume of hydrogen. The yield of solid polymer was equivalent to 79.3 g per millimole of titanium in the catalyst. 1.26% by weight of diluent soluble polymer was obtained. The melt flow index (MFI) of the polymer was measured by ASTM Test Method D 1238-70, Condition N (190° C. and 10 kg) and was found to be 10.8.

EXAMPLE 29

Polymerisation was carried out as described in Example 10 with the exception that the pentamethylheptane fraction was saturated with propylene containing 0.043% by volume of hydrogen. A pressure of one atmosphere was maintained during polymerisation by feeding propylene which contained 0.068% by volume of hydrogen. The yield of solid polymer was 77.7 g per millimole of titanium in the catalyst. 0.99% by weight of diluent soluble polymer was formed. The polymer had an MFI of 12.5 and a flexural modulus of 1.71 GN/m$^2$.

The flexural modulus was measured using a cantilever beam apparatus as described in Polymer Age, March 1970, pages 57 and 58. The deformation of a test strip at 1% skin strain after 60 seconds at 23° C. and 50% relative humidity was measured. The test strip, which had dimensions of approximately 150×19×1.6 mm, was prepared in the following manner.

23 g of the polymer were mixed with 0.1% by weight of an antioxidant ('Topanol' CA), and the mixture was added to a Brabender Plasticiser, at 190° C., 30 rpm and under a load of 10 kg to convert it to a crepe. The crepe was placed within a template, between aluminium foil and pressed by means of an electric Tangye press at a temperature of 250° C. The pressing was pre-heated for a period of 6 minutes, under just enough pressure to make the polymer flow across the template, that is an applied force of about 1 ton. After the pre-heat period, the applied force was raised to 15 tons in 5 ton increments, de-gassing (that is releasing pressure) every 5 tons. After 2 minutes at 15 tons, the press was cooled by means of air and water for 10 minutes or until room temperature was reached. The plaque obtained was then cut into strips of dimensions 150×19×1.6 mm. Duplicate strips of each polymer were placed into an annealing oven at 130° C. and after two hours at this temperature the heat was switched off and the oven cooled to ambient temperature at 15° C. per hour.

EXAMPLE 30

2 liters of the pentamethylheptane fraction were added to a five-liter stainless steel autoclave and were purged with nitrogen and evacuated at 60° C., this procedure being repeated three times and the autoclave was then evacuated to a pressure of 0.1 mm of mercury whilst stirring vigorously. Stirring was continued and propylene was introduced to raise the pressure to one atmosphere. 16.8 cm$^3$ of a solution, in the pentamethylheptane fraction, containing 16 millimoles of triethyl aluminium were added followed by 12 cm$^3$ of a solution, in the pentamethylheptane fraction, containing 6 millimoles of ethyl anisate. Then 5 cm$^3$ of a suspension of the product of Example 3 were added and propylene was added to the autoclave until a pressure of 7 kg/cm$^2$ gauge was achieved. Polymerisation was continued at 60° C. for two hours at 7 kg/cm$^2$ and was then terminated by venting off the excess propylene and exposing the contents of the autoclave to air. By analysis, the polymer product contained 40 ppm of titanium by weight. This corresponds to a yield of 1200 g of polypropylene per millimole titanium. The proportion of diluent soluble polymer was 2.6% by weight.

EXAMPLE 31

(A) Reaction of alumina and magnesium butyl 13.8 g of the alumina treated as described in treatment (C) were placed in a 300 cm$^3$ reaction vessel provided with a sintered glass frit and a stirrer under an atmosphere of nitrogen. To the vessel were slowly added 260 cm$^3$ of a 0.66 M solution of the magnesium dibutyl mixture in the isoparaffin fraction, both as described in step (A) of Example 1. The mixture was stirred at ambient temperature for 16 hours.

(B) Treatment with silicon tetrachloride

To the mixture from stage (A) were added 100 cm$^3$ of silicon tetrachloride. This mixture was stirred for 60 hours at ambient temperature (about 20° C.), heated to 80° C. and stirred at that temperature for a further three hours. The solid was then filtered and washed as described in step (B) of Example 1.

(C) Treatment with ethyl benzoate

The washed solid from step (B) was suspended in a solution of 17.2 cm$^3$ of ethyl benzoate in 100 cm$^3$ of the pentamethylheptane fraction used in Examples 6 to 27 (the molar ratio of ethyl benzoate to magnesium compound wad 0.7 to 1). The mixture was stirred at ambient temperature for 16 hours and then filtered. The solid was washed three times using 100 cm$^3$ of the pentamethylheptane fraction for each wash.

(D) Treatment with titanium tetrachloride

The solid from step (C) was suspended in 150 cm$^3$ of titanium tetrachloride, the mixture was heated to 80° C. and maintained at that temperature for three hours. The mixture was filtered at 80° C. and the solid was washed four times at 80° C. using 100 cm$^3$ of the pentamethylheptane fraction for each wash.

The solid was finally suspended in 100 cm$^3$ of the pentamethylheptane fraction.

EXAMPLE 32

The procedure of Example 31 was repeated using different quantities of reactants, as set out in Table 2, and using the alumina treated as described in treatment (B).

EXAMPLE 33

The procedure of Example 31 was repeated using different quantities of reactants, as set out in Table 2, and using the alumina treated as described in treatment (D).

TABLE 2

| Reactant | Quantity | |
| --- | --- | --- |
|  | Example 32 | Example 33 |
| Alumina (g) | 5.37 | 5.0 |
| 0.64 M Magnesium Dibutyl solution (cm$^3$) | 100 | 50 |
| SiCl$_4$ (cm$^3$) | 50 | 50 |
| Ethyl benzoate (cm$^3$) | 0.6 | 0.6 |
| TiCl$_4$ (cm$^3$) | 100 | 100 |

EXAMPLES 34 TO 39

The polymerisation process of Examples 6 to 27 was repeated using the products of Examples 31 to 33. The results, and further details, are summarised in Table 3.

TABLE 3

| Example (a) | Ti Compound | | Yield (g/mM) (c) | Wt. % Diluent Soluble Polymer (d) |
| --- | --- | --- | --- | --- |
|  | Type | Amount (mM) (b) | | |
| 34* | 31 | 0.42 | 86.6 | 20.8 |
| 35 | 31 | 0.42 | 42.9 | 1.32 |
| 36* | 32 | 0.24 | 33.8 | 32.4 |
| 37 | 32 | 0.73 | 12.3 | 7.05 |
| 38* | 33 | 0.18 | 42.8 | 35.2 |
| 39 | 33 | 0.54 | 24.3 | 5.05 |

Notes to Table 3
(a) to (d) are all as defined in Notes to Table 1.

EXAMPLE 40

(A) Reaction of silica with magnesium dibutyl 11 g of the silica dried as described in treatment (A) were placed in a 200 cm$^3$ reaction vessel provided with a sintered glass frit and a stirrer and suspended in 140 cm$^3$ of dry n-heptane. The mixture was stirred and 21.9 cm$^3$ of a solution of the magnesium dibutyl mixture in the isoparaffin fraction, both as described in step (A) of Example 1, were added. The magnesium dibutyl solution contained 12.2 milligramme atoms of magnesium.

The mixture was stirred for two hours at ambient temperature.

(B) Treatment with hydrogen chloride

To the stirred suspension obtained in step (A) were added, whilst continuing to stir at ambient temperature and pressure, 100 cm$^3$ of dry hydrogen chloride gas. Two further additions of hydrogen chloride were made at 5 minute intervals. After a further hour, three further additions of hydrogen chloride (100 cm$^3$ each time) were made at intervals of half an hour. An hour after the final addition of hydrogen chloride, the apparatus was purged with nitrogen, the mixture was filtered and the solid was washed three times using 100 cm$^3$ of n-heptane for each wash. The solid was finally suspended in 100 cm$^3$ of n-heptane.

(C) Treatment with ethyl benzoate

To the suspension from step (B) was added a solution of 1.2 cm$^3$ of ethyl benzoate in 60 cm$^3$ of n-heptane. The mixture was stirred at ambient temperature for 16 hours. The mixture was filtered and the solid was washed twice using 100 cm$^3$ of n-heptane for each wash.

(D) Treatment with titanium tetrachloride

The solid from step (C) was suspended in 100 cm$^3$ of neat titanium tetrachloride. The mixture was stirred and heated up to 80° C., which temperature was maintained for 2 hours. The mixture was filtered at 80° C. and the solid was washed four times at 80° C. using 100 cm$^3$ of heptane for each wash.

The solid was suspended in 60 cm$^3$ of n-heptane at ambient temperature. Analysis of the suspension found that 5 cm$^3$ contained 0.21 milligramme atoms of titanium, 0.46 milligramme atoms of magnesium and 2.0 milligramme atoms of chlorine.

EXAMPLE 41

The procedure of Example 40 was repeated using different quantities of some of the reactants as listed hereafter.

Silica: 9.7 g
Magnesium dibutyl: 10.8 millimoles
Hydrogen chloride (total): 250 cm$^3$*
Ethyl benzoate: 1.1 cm$^3$

*The hydrogen chloride was added in quantities of 100 cm$^3$, 100 cm$^3$ and 50 cm$^3$ at 5 minute intervals and after stirring for a further hour, the mixture was then purged.

Analysis of the suspension found that 5 cm$^3$ contained 0.388 milligramme atoms of titanium, 0.641 milligramme atoms of magnesium and 2.2 milligramme atoms of chlorine.

EXAMPLES 42 AND 43

The products of Examples 40 and 41 were used to polymerise propylene using the procedure of Examples 6 to 27. The results obtained are set out in Table 4.

TABLE 4

| | Ti Compound | | Yield | Wt % Diluent Soluble Polymr |
|---|---|---|---|---|
| Example | Type | Amount (mM) (b) | (g/mM) (c) | (d) |
| 42 | 40 | 0.21 | 88 | 0.81 |
| 43 | 41 | 0.39 | 39.4 | 1.78 |

Note to Table 4
(b) to (d) are all as defined in Notes to Table 1.

EXAMPLE 44

(A) Reaction of silica with magnesium dibutyl 10 g of the silica dried as described in treatment (A) were suspended in 50 cm$^3$ of the pentamethylheptane fraction described in Example 4. 40 cm$^3$ of a 0.625 M solution of the magnesium dibutyl mixture in the isoparaffin fraction, both as described in step (A) of Example 1, were added and the mixture was stirred for 16 hours at ambient temperature. The mixture was filtered and the solid was washed twice at ambient temperature using 100 cm$^3$ of the pentamethylheptane fraction for each wash.

(B) Treatment with trimethyl silicon chloride

The washed solid from step (A) was suspended in a solution of 50 cm$^3$ of the pentamethylheptane fraction and 5 cm$^3$ trimethyl silicon chloride and the mixture was stirred first for 16 hours at ambient temperature and thereafter for 3 hours at 80° C. The mixture was cooled, filtered and the solid was washed four times using 100 cm$^3$ of the pentamethylheptane fraction for each wash.

(C) Treatment with ethyl benzoate

The washed solid from step (B) was suspended in a solution of 1.15 cm$^3$ of ethyl benzoate in 100 cm$^3$ of the pentamethylheptane fraction and the mixture was stirred for 16 hours at ambient temperature. The mixture was then filtered and the solid washed four times using 100 cm$^3$ of the pentamethylheptane fraction for each wash.

(D) Treatment with titanium tetrachloride

The washed solid from step (C) was suspended in 100 cm$^3$ of titanium tetrachloride and the mixture was stirred for 3 hours at 80° C. The mixture was filtered without cooling and washed four times using 100 cm$^3$ of n-heptane at 80° C. for each wash. The solid was finally suspended in 100 cm$^3$ of n-heptane.

EXAMPLE 45

(A) Reaction of silica with magnesium aluminium butyl 6.5 g of the silica dried as described in treatment (A) were suspended in 100 cm$^3$ of n-heptane. 50 cm$^3$ of a 0.56 M solution of a magnesium aluminium butyl of the formula Mg(C$_4$H$_9$)$_2$0.5Al(C$_4$H$_9$)$_3$ in n-heptane were added and the mixture was stirred for 24 hours at ambient temperature.

(B) Treatment with silicon tetrachloride

To the mixture from step (A) were added 50 cm$^3$ of silicon tetrachloride and the mixture was stirred first for 16 hours at ambient temperature and thereafter for three hours at 80° C. The mixture was allowed to cool, filtered and the solid was washed four times using 100 cm$^3$ of the n-heptane for each wash.

(C) Treatment with ethyl benzoate

The washed solid from step (B) was suspended in a solution of 0.75 cm$^3$ of ethyl benzoate in 100 cm$^3$ of n-heptane and the mixture was stirred for 16 hours at ambient temperature. The mixture was then filtered and the solid washed three times using 100 cm$^3$ of the pentamethylheptane fraction for each wash.

(D) Treatment with titanium tetrachloride

The procedure described in step (D) of Example 44 was repeated except that the solid was washed with the pentamethylheptane fraction and finally suspended in 100 cm$^3$ of the pentamethylheptane fraction.

EXAMPLE 46

(A) Reaction of silica with magnesium dibutyl 10.9 g of the silica dried as described in treatment (A) were suspended in 100 cm$^3$ of the pentamethylheptane fraction described in Example 4 and the procedure described in step (A) of Example 44 was repeated with the exception that the solid was washed only once.

(B) and (C) Treatment with silicon tetrachloride and ethyl benzoate

To the washed solid from step (A) were added 50 cm$^3$ of the pentamethylheptane fraction, 50 cm$^3$ of silicon tetrachloride and then 1.15 cm$^3$ of ethyl benzoate. The mixture was stirred first for 22 hours at ambient temperature and thereafter for three hours at 80° C. The mixture was allowed to cool, filtered and the solid was washed three times using 100 cm$^3$ of the pentamethylheptane fraction for each wash.

(D) Treatment with titanium tetrachloride

The procedure described in step (D) of Example 45 was repeated.

COMPARATIVE EXAMPLE C

(A) Reaction of silica with magnesium dibutyl 7.16 g of the silica dried as described in treatment (A) were suspended in 100 cm$^3$ of the pentamethylheptane fraction described in Example 4 and the procedure described in step (A) of Example 44 was repeated with the exception that the mixture was not filtered, nor the solid washed.

(B) Treatment with silicon tetrachloride

To the mixture from step (A) were added 50 cm$^3$ of silicon tetrachloride and the mixture was stirred first for 16 hours at ambient temperature and thereafter for three hours at 80° C. The mixture was allowed to cool, filtered and the solid was washed three times using 100 cm$^3$ of the pentamethylheptane fraction for each wash.

(C) Treatment with titanium tetrachloride

The washed solid from step (B), without being treated with a complexing agent, was subjected to the procedure of step (D) of Example 45.

EXAMPLE 47

6 g of the solid product of Comparative Example C were suspended in 100 cm$^3$ of the pentamethylheptane fraction. To the suspension were added 1.15 cm$^3$ of a 0.69 M solution of ethyl benzoate in the pentamethylheptane fraction. The mixture was stirred, heated to 80° C. and stirred at 80° C. for one hour. The mixture was then allowed to cool, filtered and the solid washed three times using 100 cm$^3$ of the pentamethylheptane fraction for each wash. The solid was finally suspended in 100 cm$^3$ of the pentamethylheptane fraction.

EXAMPLE 48

The procedure described in Example 44 was repeated with the exception that the quantity of silica was 4.41 g, 16 cm$^3$ of the magnesium dibutyl solution were used, 50 cm$^3$ of silicon tetrachloride were used in step (B) instead of the trimethyl silicon chloride and in step (C), 1.37 cm$^3$ of di-isobutyl ether were used, instead of ethyl benzoate.

EXAMPLE 49

(A) Reaction of silica with silicon tetrachloride 7.06 g of the silica dried as described in treatment (A) were suspended in 100 cm$^3$ of the pentamethylheptane fraction. 50 cm$^3$ of silicon tetrachloride were added, the mixture was stirred, heated to 80° C. and maintained at that temperature for two hours. The mixture was allowed to cool, to ambient temperature, filtered and the solid was washed three times at ambient temperature using 100 cm$^3$ of the pentamethylheptane fraction for each wash.

(B) Treatment with magnesium dibutyl

The washed solid from step (A) was suspended in 100 cm$^3$ of the pentamethylheptane fraction and 28 cm$^3$ of the magnesium dibutyl solution used in step (A) of Example 44 were added. The mixture was stirred for 16 hours at ambient temperature, filtered and the solid was washed three times using 100 cm$^3$ of the pentamethylheptane fraction for each wash.

(C) Treatment with ethyl benzoate

The washed solid from step (B) was suspended in a solution of 0.8 cm$^3$ of ethyl benzoate in 100 cm$^3$ of the pentamethylheptane fraction and the mixture was stirred for 16 hours at ambient temperature. The mixture was then filtered and the solid washed three times using 100 cm$^3$ of the pentamethylheptane fraction for each wash.

(D) Treatment with titanium tetrachloride

The washed solid from step (C) was suspended in 100 cm$^3$ of titanium tetrachloride and the mixture was stirred for three hours at 85° C. The mixture was filtered without cooling and washed four times using 100 cm$^3$ of the pentamethylheptane fraction at 85° C. for each wash. The solid was finally suspended in 100 cm$^3$ of the pentamethylheptane fraction.

EXAMPLE 50

(A) Reaction of silica with magnesium dibutyl

The procedure of step (A) of Example 44 was carried out using 6.56 g of silica in 100 cm$^3$ of the pentamethylheptane fraction and washing the solid product three times.

(B) Treatment with silicon tetrachloride

The washed solid from step (A) was suspended in 50 cm$^3$ of the pentamethylheptane fraction and 50 cm$^3$ of silicon tetrachloride were added. The mixture was stirred, heated to 80° C. and maintained at that temperature for three hours. The mixture was allowed to cool, filtered and the solid was washed three times using 100 cm$^3$ of the pentamethylheptane fraction for each wash.

(A1) and (B1) Repeat of treatments with magnesium dibutyl and silicon tetrachloride The washed solid from step (B) was subjected to a repeat of the foregoing steps (A) and (B), with the exception that in the repeat of step (B), 100 cm$^3$ of the pentamethylheptane fraction were used.

(C) Treatment with ethyl benzoate

The washed solid from step (B1) was suspended in 100 cm³ of the pentamethylheptane fraction, 0.8 cm³ of ethyl benzoate was added and the mixture was stirred for 16 hours at ambient temperature. The mixture was then filtered and the solid washed three times using 100 cm³ of the pentamethylheptane fraction for each wash.

(D) Treatment with titanium tetrachloride

The washed solid from step (C) was subjected to step (D) of Example 44 with the exception that the washing was effected with the pentamethylheptane fraction. The solid was finally suspended in 100 cm³ of the pentamethylheptane fraction.

EXAMPLE 51

The procedure of Example 44 was repeated with the exception that in step (B), 50 cm³ of silicon tetrachloride were used instead of trimethyl silicon chloride and in step (D) the treatment with titanium tetrachloride was effected at 135° C. for four hours and the mixture was then cooled to 80° C. before being filtered and washed.

EXAMPLE 52

The procedure of Example 44 was repeated with the exception that in step (A), 9.54 g of the silica heated as described in treatment (F) were used, and in step (B), 50 cm³ of silicon tetrachloride were used, instead of trimethyl silicon chloride.

EXAMPLE 53

The procedure of Example 52 was repeated with the exception that in step (A), 11.87 g of the silica heated as described in treatment (E) were used and in step (C) the quantity of ethyl benzoate was 1.2 cm³.

EXAMPLES 54 TO 73

The products of Examples 44 to 53 and Comparative Example C were used to polymerise propylene using the procedure described for Examples 6 to 27 with a polymerisation temperature of 60° C.

Further details of the technique used, and the results obtained, are given in Table 5.

TABLE 5

| Ex or Comp Ex (a) (e) | Ti Compound Type | Amount (mM) (b) | Yield (g/mM) (c) | Wt % Diluent Soluble Polymer (d) | Time (hrs) |
|---|---|---|---|---|---|
| 54* | 44 | 0.43 | 52 | 35 | 2 |
| 55 | 44 | 0.43 | 43.7 | 2.15 | 2 |
| 56* | 45 | 0.085 | 98.8 | 33.3 | 2 |
| 57 | 45 | 0.17 | 173 | 0.83 | 2 |
| 58* | 46 | 0.15 | 78.6 | 34 | 2 |
| 59 | 46 | 0.31 | 132.2 | 0.86 | 2 |
| D* | C | 0.33 | 108 | 38.2 | 2 |
| E | C | 0.24 | 97 | 8.05 | 2 |
| 60* | 47 | 0.23 | 72.4 | 35.1 | 2 |
| 61 | 47 | 0.23 | 52.6 | 3.28 | 2 |
| 62* | 48 | 0.21 | 101.8 | 28.1 | 2 |
| 63 | 48 | 0.21 | 84.4 | 3.52 | 2 |
| 64 | 49 | 0.28 | 120 | 2.58 | 2 |
| 65 | 50 | 0.24 | 52.7 | 1.12 | 2 |
| 66* | 51 | 0.25 | 27.3 | 60.6 | 2 |
| 67 | 51 | 0.25 | 30.6 | 1.25 | 2 |
| 68* | 52 | 0.27 | 87.6 | 26.5 | 3 |
| 69## | 52 | 0.53 | 158.8 | 4.75 | 2 |
| 70 | 52 | 0.53 | 80.1 | 0.58 | 2 |
| 71## | 53 | 0.20 | 370.2 | 5.25 | 2 |
| 72### | 53 | 0.20 | 287.6 | 2.77 | 2 |
| 73 | 53 | 0.40 | 145.1 | 1.32 | 2 |

Notes to Table 5
Notes (a) to (d) are all as defined in Notes to Table 1.
(e) ### Catalyst contained aluminium triethyl (8 mM) and ethyl anisate (2 mM).

EXAMPLE 74

The procedure of Example 29 was repeated with the exceptions that the product of Example 53 was used as the titanium compound, the amount of ethyl anisate used was 2.5 millimoles, the pentamethylheptane fraction was initially saturated with propylene containing 0.032% by volume of hydrogen, and the pressure was maintained with propylene containing 0.083% by volume of hydrogen.

The yield of solid polymer was 164.4 g per millimole of titanium in the catalyst and 2.54% by weight of diluent soluble polymer was formed. The polymer had an MFI of 20.3 and a flexural modulus of 1.49 GN/m².

EXAMPLE 75

Into a five-liter stainless steel autoclave fitted with a stirrer were placed 200 g of polypropylene powder having a flexural modulus of 1.49 GN/m² and 4.0% by weight of which was soluble in xylene using the procedure as described hereafter. The autoclave was purged at 60° C. with nitrogen, then evacuated to a pressure of 0.1 mm of mercury. Propylene was added to raise the pressure to atmospheric pressure. 16 millimoles of a 0.95 M solution of aluminium triethyl in the pentamethylheptane fraction and 3 millimoles of a 0.5 M solution of ethyl anisate in the pentamethylheptane fraction were mixed at ambient temperature. After 10 minutes mixing, the mixture was added to the autoclave. 5 cm³ of the suspension prepared in Example 53 were then added and the autoclave was pressurised to 100 psi with propylene. Polymerisation was carried out in the gas phase for 3½ hours maintaining an autoclave pressure of 100 psi by further addition of propylene.

1925 g of polypropylene per millimole of titanium in the added catalyst were produced. After making due allowance for the effect of the polymer initially present, 13.4% by weight of this polymer remained in solution when 1 gramme of the polymer was dissolved in 50 cm³ of boiling xylene and then recrystallised by cooling to ambient temperature.

EXAMPLES 76 TO 81

The procedure of Examples 6 to 27 was used with the exception that ethylene was used in place of propylene and the catalyst consisted on the titanium component and aluminium triethyl only. The polymerisation time was two hours. The results obtained are set out in Table 6.

TABLE 6

| Example | Ti Compound Type | Amount (mM) (b) | Yield g/mM (c) |
|---|---|---|---|
| 76 | 5 | 0.19 | 340 |
| 77 | 31 | 0.041 | 1028 |
| 78 | 44 | 0.043 | 731 |

TABLE 6-continued

| | Ti Compound | |
|---|---|---|
| | Amount (mM) | Yield g/mM |

| Example | Type | (b) | (c) |
|---|---|---|---|
| 79 | 46 | 0.031 | 1173 |
| 80 | 49 | 0.025 | 2500 |
| 81 | 53 | 0.10 | 130 |

Notes to Table 6
(b) and (c) are both as defined in Notes to Table 1.

EXAMPLES 82 TO 97

Into a stirred stainless steel autoclave of 30 liters capacity were introduced 13 liters of a mixture of hexane and hexene-1. The mixture also contained 40 millimoles of aluminium triethyl and 50 ppm by weight of an antistatic agent of the formula $C_6F_{13}O(CH_2CH_2O)_8C_nH_{(2n+1)}$ where n has a value of from 16 to 18.

The contents of the reactor were stirred and heated up to 60° C. Hydrogen and ethylene were added to give a total pressure of 80 psi gauge (5.6 Kg/cm² gauge). A titanium-containing component was then added in a quantity to attain, and subsequently to maintain, a monitored ethylene consumption of between 1.0 and 1.5 kg per hour. Ethylene, or a mixture of ethylene and hydrogen, was added at a rate sufficient to maintain the pressure of 80 psi gauge (5.6 Kg/cm² gauge). During the reaction, a 0.1 M solution of aluminium triethyl in hexane was added continuously at a rate of 40 millimoles per hour.

The polymerisation was terminated and the polymer product consequently recovered by transferring to a vessel of 200 liters capacity containing 50 liters of an 0.01 N aqueous solution of sodium hydroxide and then passing steam through the stirred mixture until all of the hexane had been evaporated. The aqueous polymer suspension was then filtered and the polymer was dried in a fluid bed drier using hot nitrogen as the fluidising gas.

Further details of the polymerisations, and the results obtained, are set out in Table 7.

TABLE 7

| Ex No | Ti Compound Type | Amount (mM) (b) (f) | % Wt hexene-1 (h) | Hydrogen Initial Pressure (Kg/cm²) (i) | % Wt in Ethylene Feed | Polymer MFI (j) | Polymer Density (Kg/m³) (k) | Polymer Yield (Kg) | Polyn Time (hrs) (l) |
|---|---|---|---|---|---|---|---|---|---|
| 82 | 31 | 1.6 | 11 | 1.41 | 2 | 0.2 | 944 | 2.1 | 1.45 |
| 83 | 31 | 0.6 | 30 | 0.77 | 0 | 0.1 | 930 | 2.8 | 1.45 |
| 84 | 31 | 0.4 | 37 | 0.56 | 0 | 0.1 | 924 | 2.85 | 1.45 |
| 85 | 31 | 0.3 | 30 | 0.98 | 0 | 0.1 | 929 | 2.39 | 1.45 |
| 86 | 31 | 3.8* | 32* | 1.76 | 0 | 0.3 | 928 | 2.20 | 1.45 |
| 87 | 31 | 0.8 | 32 | 3.37** | 0 | 6.0 | 928 | 2.32 | 1.45 |
| 88 | 46 | 3.9 | 34 | 1.76 | 0 | 0.1 | 952 | 2.2 | 1.10 |
| 89 | 44 | 3.8 | 34 | 1.76 | 0 | 0.5 | 930 | 1.0 | 1.00 |
| 90 | 47 | 2.1 | 34 | 1.76 | 0 | 2.2 | 924 | 2.89 | 1.45 |
| 91 | 4 | 3.3 | 34 | 1.76 | 0 | 1.7 | 927 | 1.79 | 1.20 |
| 92 | 53 | 0.7 | 34 | 1.76 | 0 | 1.0 | 918 | 2.64 | 1.45 |
| 93 | 53 | 0.8 | 25 | 1.76 | 0 | 0.7 | 924 | 2.35 | 1.45 |
| 94 | 53 | 0.8 | 25 | 1.76 | 0 | 0.7 | 919 | 2.48 | 1.45 |
| 95 | 53 | 1.0 | 17 | 1.76 | 0 | 0.3 | 934 | 2.49 | 1.45 |
| 96 | 53 | 0.8 | 33 | 2.11 | 0 | 2.1 | 920 | 2.3 | 1.45 |
| 97 | 49 | 2.7 | 33.5 | 1.76 | 0 | ND | ND | 0.8 | 1.00 |

Notes to Table 7
(b) is as defined in Notes to Table 1.
(f) *In this run, the aluminium triethyl was added at a rate of 20 millimoles per hour.
(h) Expressed as $$\frac{(Wt\ hexene-1) \times 100}{Wt\ initial\ mixture\ of\ hexene-1\ plus\ hexane}$$

(i) **Pressure was 105 psi gauge (7.38 Kg/cm²) gauge throughout the polymerisation.
(j) MFI measured by ASTM Method D 1238-70 at 190° C. using a 2.16 Kg weight.
(k) Density was measured as described in ASTM 1928/70, Method A, using a density gradient column at 23° C.
(l) Figures after the decimal point equal minutes, that is 1.10 means 1 hr 10 minutes.
ND means Not Determined.

EXAMPLE 98

(A) Reaction with silica and magnesium dibutyl 167 g of the silica dried as described in treatment (E) were suspended in 1670 cm³ of the isoparaffin fraction having a boiling temperature range of 117° C. to 135° C., in a two-liter reaction vessel provided with a vapour jacket and a stirrer. 539 cm³ of a 0.62 M solution of magnesium dibutyl (an equimolar mixture of primary and secondary dibutyl magnesium) in the isoparaffin fraction were added to the suspension. The mixture was then stirred at ambient temperature (about 20° C.) for two hours. The stirring was stopped and the solid was allowed to settle. The supernatant liquid was then removed, the solid was washed four times using 1500 cm of the isoparaffin fraction at ambient temperature for each wash and the washed solid was suspended in one liter of the isoparaffin fraction at ambient temperature.

(B) Treatment with silicon tetrachloride

To the mixture from step (A) were added 835 cm³ of silicon tetrachloride. This mixture was stirred and heated gently up to reflux temperature (about 80° C.) and stirred at that temperature for a further four hours. The mixture was then allowed to cool and settle, the supernatant liquid was removed and the solid was washed six times using 1500 cm³ of the isoparaffin fraction at ambient temperature for each wash.

(C) Treatment with ethyl benzoate

The washed solid from step (B) was suspended in a solution of 19.2 cm³ of ethyl benzoate in 1400 cm³ of the isoparaffin fraction and the mixture was stirred at ambient temperature for four hours. The supernatant liquid was then removed and the solid was washed six times using 1500 cm³ of the isoparaffin fraction at ambient temperature for each wash. After the final wash, most of the liquid was removed by forcing it through a glass tube at the lower end of which was located a sintered glass frit.

(D) Treatment with titanium tetrachloride

The washed solid from step (C) was suspended in 1670 cm³ of titanium tetrachloride, the mixture was heated to 80° C. and maintained at that temperature for four hours. The supernatant liquid was removed without cooling and the solid was then washed ten times using 1500 cm³ of the isoparaffin fraction at 80° C. for each wash. The solid was finally suspended in 1670 cm³ of the isoparaffin fraction at ambient temperature.

EXAMPLE 99

The procedure of Example 98 was repeated with the exception that some of the conditions were varied, as detailed hereafter.

In step (A), 178 g of the solid, 1780 cm³ of the isoparaffin and 574 cm³ of the magnesium dibutyl solution were used.

In step (B), 500 cm³ of silicon tetrachloride were used and the mixture was heated to 80° C., at which temperature no refluxing of the mixture occurred.

In step (D), 1450 cm³ of titanium tetrachloride were used.

EXAMPLE 100

The procedure of Example 98 was repeated with the following modifications.

In step (A), 63.5 g of the silica gel dried as described in treatment (G) were suspended in 635 cm³ of the isoparaffin fraction. 200 cm³ of a 0.635 M solution of magnesium dibutyl were added, the mixture was stirred for 30 minutes and then the supernatant liquid was removed. The solid was washed five times using one liter of the isoparaffin fraction for each wash and the solid was then suspended in 635 cm³ of the isoparaffin fraction.

In step (B), 250 cm³ of silicon tetrachloride were used and stirring at 80° C. was continued for 30 minutes only. The solid was washed four times using one liter of the isoparaffin fraction for each wash.

In step (C), a solution of 7.6 cm³ of ethyl p-fluorobenzoate in 635 cm³ of the isoparaffin fraction was used, and stirring was continued for 30 minutes only. The solid was washed three times using one liter of the isoparaffin fraction for each wash.

In step (D), 400 cm³ of titanium tetrachloride were used and stirring at 80° C. was continued for 30 minutes only. The amount of the isoparaffin fraction used for each of the ten washing stages was one liter and for the final resuspension 635 cm³ of the isoparaffin fraction was used.

EXAMPLE 101

The procedure of Example 100 was repeated with the following modifications.

In step (A), 185 g of silica was suspended in 1200 cm³ of the isoparaffin fraction and 600 cm³ of the magnesium dibutyl solution was added. The solid was washed seven times.

In step (B), 750 cm³ of silicon tetrachloride and 750 cm³ of the isoparaffin fraction were used and the mixture was heated gently up to reflux temperature (about 80° C.). The solid was washed ten times.

In step (C), a solution of 22.5 cm³ of ethyl p-fluorobenzoate and 1850 cm³ of the isoparaffin fraction was used, the mixture was stirred at ambient temperature for 4.75 hours and allowed to stand (without stirring) for a further 12 hours. The solid was washed seven times.

In step (D), 1500 cm³ of titanium tetrachloride were used.

EXAMPLE 102

The procedure of Example 49 was repeated with the following modifications.

In step (A), 24.43 g of the alumina dried as described in treatment (H), 100 cm³ of n-heptane and 50 cm³ of silicon tetrachloride were used. The mixture was stirred for 16 hours at ambient temperature. Washing was effected using n-heptane, the solid was suspended in 200 cm³ of n-heptane and the suspension was split into two equal fractions, one of which was then treated as in steps (B), (C) and (D).

In step (B), 40 cm³ of the magnesium dibutyl solution was used, and the solid was washed with n-heptane.

In step (C), the solid from step (B) was suspended in 100 cm³ of n-heptane, and 1.3 cm³ of ethyl benzoate were added. The solid was washed with n-heptane.

In step (D), the mixture was heated at 80° C. for four hours. Washing was effected using n-heptane at 80° C. The solid was finally suspended in 100 cm³ of n-heptane.

EXAMPLES 103 to 105

The products of Examples 99, 101 and 102 were used to effect the copolymerisation of ethylene using the procedure as described for Examples 82 to 97, with the following exceptions.

The initial mixture was a mixture of hexane and butene-1 and polymerisation was effected at 80° C.

Further details of the polymerisations, and the results obtained, are set out in Table 8.

TABLE 8

| | Ti Compound | | | Hydrogen | | | | | |
|---|---|---|---|---|---|---|---|---|---|
| Ex No. | Type | Amount (mM) (b) (f) | % Wt butene-1 (m) | Initial Pressure (Kg/cm²) (i) | % Wt in Ethylene Feed | Polymer MFI (j) | Polymer Density (Kg/m³) (k) | Polymer Yield (Kg) | Polyn Time (hrs) (l) |
| 103 | 99 | 3.15 | 7.0 | 2.53 | 0 | 4.23 | 917 | 0.83 | 1.5 |
| 104 | 101 | 2.25 | 7.0 | 2.67 | 0 | 6.2 | 923 | 0.85 | 1.0 |
| 105 | 102 | 1.08 | 11.9 | 2.67 | 0 | 1.35 | 921 | 0.7 | 1.0 |

Notes to Table 8
(b) is as defined in Notes to Table 1.
(f) and (i) to (l) are as defined in Notes to Table 7.
(m) Expressed as
$$\frac{(Wt\ butene-1) \times 100}{Wt\ initial\ mixture\ of\ butene-1\ plus\ hexane}$$

EXAMPLES 106 TO 108

A 20 cm internal diameter fluidised bed reactor vessel, operated in a continuous manner, was used to produce a series of ethylene/butene-1 copolymers. A reaction mixture comprising ethylene, butene-1 and hydrogen was circulated continuously through the bed at a superficial velocity estimated to be about four times the minimum necessary for fluidisation. In the fluidised bed, the reaction temperature was controlled at 80° C. by adjusting the temperature of the gas fed to the fluidised bed reactor vessel using a heat exchanger in the circulating gas loop. Aluminium trioctyl was pumped continuously into the reactor as a 0.25 molar solution in n-hexane. The product of Example 97 or 98 was blown into the reactor as a dry powder in a stream of process gas at frequent intervals so as to maintain a rate of polymer production of about 1.5 Kg/hr, which corresponds to a mean residence time of four hours. The reaction pressure was maintained automatically by admitting an ethylene/hydrogen mixture through a control valve. Liquid butene-1 was pumped into the circulating gas stream so as to maintain a constant composition as determined by Gas Liquid Chromotography.

The polymer formed was removed periodically so as to maintain an essentially constant level in the reactor vessel. The polymer collected was degassed in a stream of nitrogen which had been passed over a bath of water at ambient temperature, and then through a steam jacket. The use of this warm, moist nitrogen removed monomers and also de-activated the catalyst and alkyl residues.

Further details, together with some characteristics of the polymers obtained, are set out in Table 9.

TABLE 9

| Ex No. | Ti Compound Type | Rate mM/hr (b) | Alkyl Rate mm/hr | Gas Composition Mole % (n) Eth | B-1 | Hy | Rate of Polymer Production Kg/hr (p) | Polymer MFI dl/g (j) | Polymer Density Kg/m³ (k) | Reaction Pressure (Kg/cm² absolute) |
|---|---|---|---|---|---|---|---|---|---|---|
| 106 | 100 | 0.1 | 12 | 51.5 | 16.4 | 32.1 | 1.4 | 4.9 | 929.5 | 15 |
| 107 | 98 | 0.3 | 18 | 58.0 | 20.0 | 22.0 | 1.8 | 1.8 | 920.8 | 9.4 |
| 108 | 100 | 0.25 | 12 | 57.9 | 21.6 | 20.5 | 1.7 | 3.04 | 920 | 9.4 |

Notes to Table 9
(b) is as defined in Notes to Table 1.
(j) and (k) are as defined in Notes to Table 7.
(n) Eth is ethylene
B-1 is butene-1
Hy is Hydrogen
(p) This is the rate at which polymer is removed from the reactor vessel in order to maintain an essentially constant level in the reactor vessel.

EXAMPLE 109

(A) Reaction of silica with magnesium dibutyl 12.01 g of the silica dried as described in treatment (E) were suspended in 100 cm³ of n-heptane. 40 cm³ of a 0.62 M solution of the magnesium dibutyl mixture in the isoparaffin fraction, both as described in step (A) of Example 1, were added and the mixture was stirred for 16 hours at ambient temperature. The mixture was filtered and the solid was washed three times at ambient temperature using 100 cm³ of n-heptane for each wash.

(B) Treatment with silicon tetrachloride

To the washed solid from step (A) were added 100 cm³ of n-heptane and 50 cm³ of silicon tetrachloride. The mixture was stirred for four hours at 80° C., allowed to cool and filtered. The solid was washed three times using 100 cm³ of the n-heptane for each wash.

(C) Treatment with ethanol

The washed solid from step (B) was suspended in a solution of 0.4 cm³ of ethanol in 100 cm³ of n-heptane and the mixture was stirred for 16 hours at ambient temperature. The mixture was then filtered and the solid washed three times using 100 cm³ of the n-heptane for each wash.

(D) Treatment with titanium tetrachloride

The washed solid from step (C) was suspended in 100 cm³ of titanium tetrachloride and the mixture was stirred for four hours at 80° C. The mixture was filtered without cooling and washed five times using 100 cm³ of n-heptane at 80° C. for each wash. The solid was finally suspended in 100 cm³ of n-heptane.

EXAMPLE 110

The procedure described in Example 109 was repeated using the following different conditions.

In step (A), 9.98 g of silica were used.

In step (C), a solution of 0.15 cm³ of ethanol and 1.15 cm³ of ethyl benzoate in 100 cm³ of n-heptane was used.

EXAMPLE 111

The procedure described in Example 109 was repeated using the following different conditions.

In step (A), 11.3 g of silica were used.

In step (B), 100 cm³ of n-heptane and 50 cm³ of trichlorosilane were used.

In step (C), a solution of 1.3 cm³ of ethyl benzoate in 100 cm³ of n-heptane was used.

EXAMPLE 112

The procedure described in Example 111 was repeated using the following different condition.

In step (B), 100 cm³ of n-heptane and 50 cm³ of monomethyl silicon trichloride were used.

EXAMPLE 113

The procedure described in Example 109 was repeated using the following different conditions.

In step (A), 10.2 g of silica were used.

In step (B), 100 cm³ of n-heptane and 50 cm³ of dimethyl silicon dichloride were used.

In step (C), a solution of 1.2 cm³ of ethyl benzoate in 100 cm³ of n-heptane was used.

EXAMPLE 114

The procedure described in Example 109 was repeated using the following different conditions.

In step (A), 13.53 g of silica and 25 cm³ of a 1.3 M solution of magnesium di(n-hexyl) in the isoparaffin fraction as described in step (A) of Example 1, were used.

In step (C), a solution of 1.5 cm³ of ethyl benzoate in 100 cm³ of n-heptane was used.

EXAMPLE 115

The procedure described in Example 109 was repeated using the following different conditions.

In step (A), 9.4 g of silica were used.

In step (B), 100 cm³ of n-heptane and 50 cm³ of carbon tetrachloride were used.

In step (C), a solution of 1.0 cm³ of ethyl benzoate in 100 cm³ of n-heptane was used.

EXAMPLE 116

The procedure described in Example 109 was repeated using the following different conditions.

In step (A), 9.45 g of silica were used.

In step (B), 100 cm³ of n-heptane and 50 cm³ of tin tetrachloride were used.

In step (C), a solution of 1.1 cm³ of ethyl benzoate in 100 cm³ of n-heptane was used.

EXAMPLE 117

The procedure described in Example 109 was repeated using the following different conditions.

In step (A), 10.0 g of silica were used.

In step (C), a solution of 1.1 cm³ of ethyl p-toluate in 100 cm³ of n-heptane was used.

EXAMPLE 118

The procedure described in Example 109 was repeated using the following different conditions.

In step (A), 7.96 g of silica were used.

In step (C), a solution of 0.86 cm³ of ethyl anisate in 100 cm³ of n-heptane was used.

EXAMPLE 119

The procedure described in Example 109 was repeated using the following different conditions.

In step (A), 7.86 g of silica were used.

In step (C), a solution of 1.0 cm³ of trimethyl orthobenzoate in 100 cm³ of n-heptane was used.

COMPARATIVE EXAMPLE F 15.61 g of the silica dried as described in treatment (E) were suspended, by stirring, in 100 cm³ of n-heptane at ambient temperature. To the stirred suspension were added in turn, over a period of 5 to 10 minutes, 0.6 cm³ of ethyl benzoate, then 5 cm³ of silicon tetrachloride and finally 60 cm³ of a 0.62 M solution of the magnesium dibutyl mixture in the isoparaffin fraction, both as described in step (A) of Example 1. The temperature was raised to 95° C. and maintained at 95° C. for two hours. 5 cm³ of silicon tetrachloride were added at 95° C., and the temperature of 95° C. was maintained, with stirring, for a further two hours. The mixture was cooled and filtered. The solid was washed three times using 100 cm³ of n-heptane for each wash.

The solid was then suspended in 100 cm³ of titanium tetrachloride and the mixture was refluxed for two hours. The mixture was filtered hot, 100 cm³ of titanium tetrachloride were added, the mixture obtained was refluxed for one hour and filtered hot. 100 cm³ of titanium tetrachloride were added, the mixture was refluxed for one hour and filtered hot. The solid was cooled and was washed four times using 100 cm³ of n-heptane at ambient temperature for each wash. The solid was finally suspended in 100 cm³ of n-heptane.

EXAMPLES 120 TO 137

The polymerisation process of Examples 6 to 27 was repeated using the products of Examples 109 to 119 and the product of Comparative Example F. The results, and further details, are summarised in Table 10.

TABLE 10

| Ex or Comp Ex | Ti Compound Type | Amount (mM) (b) (q) | EA Amount (mM) (r) | Yield g/mM (c) (s) | Wt % Diluent Soluble Polymer (d) |
|---|---|---|---|---|---|
| 120 | 109 | 0.31 | 1.5 | 209 | 5.9 |
| 121 | 109 | 0.31 | 3.0 | 130 | 0.6 |
| 122 | 110 | 0.35 | 1.5 | 109 | 3.7 |
| 123 | 110 | 0.43 | 3.0 | 46 | 0.6 |
| 124 | 111 | 0.1 | 1.5 | 240 | 1.0 |
| 125 | 111 | 0.24 | 3.0 | 147 | 0.3 |
| 126 | 112 | 0.21 | 1.5 | 121 | 1.4 |
| 127 | 113 | 0.5* | 1.5 | 97.6* | 3.3 |
| 128 | 114 | 0.28 | 1.5 | 119 | 2.7 |
| 129 | 114 | 0.9 | 3.0 | 21.9 | 0.4 |
| 130 | 115 | 0.26 | 1.5 | 79.1 | 4.1 |
| 131 | 116 | 0.5 | 1.5 | 64 | 8.8 |
| 132 | 116 | 1.0 | 3.0 | 17.2 | 1.7 |
| 133 | 117 | 0.54 | 1.5 | 169 | 1.1 |
| 134 | 117 | 0.54 | 3.0 | 73 | 0.3 |
| 135 | 118 | 0.28 | 1.5 | 157 | 2.6 |
| 136 | 119 | 0.22 | 1.5 | 67 | 3.2 |
| 137 | 119 | 0.36 | 3.0 | 28 | 0.7 |
| G | F | 0.53 | 1.5 | 150 | 19.8 |
| H | F | 0.58 | 3.0 | 76 | 10.6 |

Notes to Table 10
(b) to (d) are as defined in Notes to Table 1.
(q) *This is the weight (in grammes) of the total solid product which was added to the polymerisation.
(r) EA is ethyl anisate.
(s) *This is the yield of polymer for each gramme of the total solid product which was added to the polymerisation.

EXAMPLE 138

The polymerisation process of Example 30 was repeated using 3 millimoles of ethyl anisate and sufficient of the product of Example 111 to provide 0.24 millimole of titanium. The polymer product was obtained in an amount corresponding to a yield of 1920 g of polypropylene per millimole of titanium. The proportion of diluent soluble polymer was 2.4% by weight.

We claim:

1. A process for the production of a composition suitable for use as a component of an olefine polymerisation catalyst, which process comprises treating a component I which is at least one solid inorganic oxide with a component II which is a magnesium hydrocarbyl compound, or a complex or mixture of a magnesium hydrocarbyl compound and an aluminium hydrocarbyl compound, a component III which is at least one halogenating agent, a component IV which is a Lewis Base compound and a component V which is titanium tetrachloride, wherein (A) component I is reacted with either component II or component III;

(B) the product from stage (A) is reacted with whichever of component II or component III is not used in stage (A);

(C) the product of stage (B) is reacted with either component IV or component V; and (D) the product of stage (C) is reacted with whichever of component IV or component V is not used in stage (C);

and stages (B) and (C) can be effected simultaneously using components III and IV.

2. The process of claim 1 wherein in stage (A), component I is reacted with component II, in stage (B), the product from stage (A) is reacted with component III, in stage (C), the product from stage (B) is reacted with component IV and in stage (D), the product from stage (C) is reacted with component V.

3. The process of claim 1 wherein component I is silica, alumina, magnesia or mixtures of two or more thereof.

4. The process of claim 1 wherein component II is selected from compounds of the formulae (A) $MgR_2$;
(B) $MgR_2aAlR_3$; and
(C) $MgR_2 + aAlR_3$ where
  each R, which may be the same or different, is a hydrocarbyl group; and
  a has a value up to 2.

5. The process of claim 1 wherein the quantity of component II is in excess of one mole for each mole of reactive sites on the solid inorganic oxide which is component I.

6. The process of claim 1 wherein component III is a hydrogen halide, a silicon halide of the formula $$R_b^1 SiX_{(4-b)},$$

a carboxylic acid halide of the formula $$R^2COX,$$

a hydrocarbyl halide of the formula $$R^3X_c,$$

phosphorus pentachloride, thionyl chloride, sulphuryl chloride, phosgene, nitrosyl chloride, a halide of a mineral acid, chlorine, bromine, a chlorinated polysiloxane, a hydrocarbyl aluminium halide, aluminium chloride or ammonium hexafluorosilicate, wherein
  $R^1$ is hydrogen or a hydrocarbyl group;
  $R^2$ is a hydrocarbyl group;
  $R^3$ is a hydrocarbyl residue;
  X is a halogen atom;

b is 0 or an integer from 1 up to 3; and
c is an integer from 1 up to 10.

7. The process of claim 6 wherein the quantity of the at least one halogenating agent is sufficient to provide at least one halogen atom at every reactive site on the at least one solid inorganic oxide which is component I.

8. The process of claim 1 wherein the Lewis Base compound which is component IV is an ether, an alcohol, an ortho-ester or an ester.

9. The process of claim 8 wherein the Lewis Base compound which is component IV is an ester of the formula $$R^8COOR^9$$

wherein
  $R^8$ is an aryl group which may be substituted by one or more hydrocarbyloxy groups; and
  $R^9$ is an alkyl group.

10. The process of claim 1 wherein the Lewis Base compound which is component IV is used in an amount of from 0.1 up to 0.8 mole for each mole of magnesium or magnesium plus aluminium.

11. The process of claim 1 wherein the amount of titanium tetrachloride which is component V is in a molar excess relative to the magnesium, or magnesium plus aluminium, which is present in the supported product.

12. The process of claim 1 wherein the product is separated and washed between each stage of the reaction.

13. An olefine polymerisation catalyst which comprises
  (1) the reaction product obtained by the process of claim 1; and
  (2) an organic compound of a metal of Group IIA of the Periodic Table or of aluminium or a complex of an organo-metallic compound of a metal of Group IA or Group IIA of the Periodic Table with an organic compound of aluminium.

14. The catalyst of claim 13 wherein component (2) is an aluminium trihydrocarbyl compound and the catalyst also includes an ester of the formula $$R^8COOR^9$$

wherein
  $R^8$ is an aryl group which may be substituted by one or more hydrocarbyloxy groups; and
  $R^9$ is an alkyl group.

* * * * *